United States Patent
Sarah et al.

(10) Patent No.: US 9,600,762 B2
(45) Date of Patent: Mar. 21, 2017

(54) DEFINING DYNAMICS OF MULTIPLE NEURONS

(71) Applicant: QUALCOMM Incorporated, San Diego, CA (US)

(72) Inventors: Anthony Sarah, San Diego, CA (US); Jeffrey Alexander Levin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 256 days.

(21) Appl. No.: 14/047,885

(22) Filed: Oct. 7, 2013

(65) Prior Publication Data

US 2014/0310217 A1 Oct. 16, 2014

Related U.S. Application Data

(60) Provisional application No. 61/811,498, filed on Apr. 12, 2013.

(51) Int. Cl.
*G06N 3/063* (2006.01)
*G06N 3/04* (2006.01)

(52) U.S. Cl.
CPC .......... *G06N 3/063* (2013.01); *G06N 3/049* (2013.01)

(58) Field of Classification Search
None
See application file for complete search history.

(56) References Cited

U.S. PATENT DOCUMENTS

| 5,222,196 A | * | 6/1993 | Bigus .................... G06N 3/04 706/44 |
|---|---|---|---|
| 8,156,057 B2 | | 4/2012 | Nugent |
| 8,326,782 B2 | | 12/2012 | Snook et al. |
| 2012/0173471 A1 | | 7/2012 | Ananthanarayanan et al. |
| 2012/0317063 A1 | | 12/2012 | Sim et al. |
| 2013/0073501 A1 | | 3/2013 | Hunzinger et al. |

FOREIGN PATENT DOCUMENTS

| TW | 200532524 A | 10/2005 |
|---|---|---|
| TW | 200923803 A | 6/2009 |

OTHER PUBLICATIONS

Coombes S ., et al., "Nonsmooth dynamics in spiking neuron models", Physica D, vol. 241, No. 22, May 13, 2011 (May 13, 2011), pp. 2042-2057, XP055098448, DOI: 10.1016/j.physd.2011. 05.012 section 4.
International Search Report and Written Opinion—PCT/US2014/033488—ISA/EPO—Aug. 14, 2014.
Rast, A., et al., "Concurrent heterogeneous neural model simulation on real-time neuromimetic hardware", Neural Networks, vol. 24, No. 9, Jul. 2, 2011 (Jul. 2, 2011), pp. 961-978, XP028298415, DOI: 10.1016/j.neunet.2011.06.014.

(Continued)

*Primary Examiner* — Alan Chen
(74) *Attorney, Agent, or Firm* — Seyfarth Shaw LLP

(57) ABSTRACT

A method for dynamically setting a neuron value processes a data structure including a set of parameters for a neuron model and determines a number of segments defined in the set of parameters. The method also includes determining a number of neuron types defined in the set of parameters and determining at least one boundary for a first segment.

20 Claims, 11 Drawing Sheets

(56) References Cited

OTHER PUBLICATIONS

Ros E., et al., "Event-driven simulation scheme for spiking neural networks using lookup tables to characterize neuronal dynamics", Neural Computation, vol. 18, No. 12, Oct. 19, 2006 (Oct. 19, 2006), pp. 2959-2993, XP055103194, DOI: 10.1162/neco.2006.18.12.2959 sections 1, 2 and 8.

Soleimani, H., et al., "Biologically inspired spiking neurons: Piecewise linear models and digital implementation", IEEE Transactions on Circuits and Systems I: Regular Papers, vol. 59, No. 12, Aug. 14, 2012 (Aug. 14, 2012). pp. 2991-3004, XP011473718, DOI: 10.1109/TCSI.2012.2206463.

Taiwan Search Report—TW103113436—TIPO—Jan. 5, 2016.

\* cited by examiner

505

```
G11[NEURON_TYPE_COUNT][BIN_COUNT] =
{              1       2       3       4       5       6       7       8
    a  { -0.433,  0.288,  1.189,  0.175, -0.588,  0.114, -0.096, -1.336 },
    b  { -1.666, -1.146, -0.038, -0.187,  2.183,  1.067, -0.832,  0.714 },
    c  {  0.125,  1.191,  0.327,  0.726, -0.136,  0.059,  0.294,  1.624 },
};
```

510

```
G12[NEURON_TYPE_COUNT][BIN_COUNT] =
{              1       2       3       4       5       6       7       8
    a  { -0.692, -1.594, -0.400,  0.712,  1.191, -0.157, -1.056,  0.529 },
    b  {  0.858, -1.441,  0.690,  1.290, -1.202, -1.604,  1.415,  0.219 },
    c  {  1.254,  0.571,  0.816,  0.669, -0.020,  0.257, -0.805, -0.922 },
};
```

515

```
G21[NEURON_TYPE_COUNT][BIN_COUNT] =
{              1       2       3       4       5       6       7       8
    a  { -2.171,  0.614,  0.591, -1.009,  0.000, -1.874,  0.731,  0.677 },
    b  { -0.059,  0.508, -0.644, -0.020, -0.318,  0.428,  0.578,  0.569 },
    c  { -1.011,  1.692,  0.380, -0.048,  1.095,  0.896,  0.040, -0.256 },
};
```

520

```
G22[NEURON_TYPE_COUNT][BIN_COUNT] =
{              1       2       3       4       5       6       7       8
    a  { -0.377, -0.234,  1.444,  0.799,  0.212, -0.742,  0.390, -0.560 },
    b  { -0.296,  0.118, -0.351,  0.941,  0.238,  1.082,  0.088,  0.444 },
    c  { -1.475,  0.315,  0.623, -0.992, -1.008, -0.131, -0.635, -0.950 },
};
```

525

```
H1[NEURON_TYPE_COUNT][BIN_COUNT] =
{              1       2       3       4       5       6       7       8
    a  {  0.781, -0.266,  0.986,  0.234, -0.947, -1.056, -1.217, -1.349 },
    b  {  0.569, -1.188, -0.519,  0.021, -0.374,  1.472, -0.041, -0.261 },
    c  { -0.822, -2.202,  0.327, -1.004, -1.186,  0.056, -1.128,  0.953 },
};
```

530

```
H2[NEURON_TYPE_COUNT][BIN_COUNT] =
{              1       2       3       4       5       6       7       8
    a  {  0.129, -0.461, -1.319, -0.645, -0.990,  1.479, -1.292, -0.844 },
    b  {  0.656, -0.262,  0.931,  0.806,  1.340,  1.138, -0.073,  0.498 },
    c  { -1.168, -1.213,  0.011,  0.232,  0.290, -0.684, -0.331,  1.488 },
};
```

DEFINING DYNAMICS OF MULTIPLE NEURONS

CROSS REFERENCE TO RELATED APPLICATION

The present application claims the benefit of U.S. provisional patent application No. 61/811,498 filed on Apr. 12, 2013, in the names of Sarah et al., the disclosure of which is expressly incorporated by reference herein in its entirety.

BACKGROUND

Field

Certain aspects of the present disclosure generally relate to neural system engineering and, more particularly, to systems and methods for defining the dynamics of multiple neurons.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Thus, it is desirable to provide a neuromorphic receiver to generate an adaptable neuronal data structure for defining dynamics of multiple neurons.

SUMMARY

In an aspect of the present disclosure, a method for dynamically setting a neuron value processes a data structure comprising a set of parameters for a neuron model. The method also includes determining a number of segments defined in the set of parameters. The method also includes determining a number of neuron types defined in the set of parameters and determining at least one boundary for a first segment.

In another aspect, a method for generating a neural model includes receiving an indication of a neuron type, determining a set of parameter values based on the neuron type and generating the neural model in accordance with the parameter values.

In yet another aspect, an apparatus for dynamically setting a neuron value is disclosed. The apparatus has a memory and at least one processor coupled to the memory. The processor(s) is configured to process a data structure comprising a set of parameters for a neuron model. The processor(s) is also configured to determine a number of segments defined in the set of parameters, to determine a number of neuron types defined in the set of parameters, and to determine at least one boundary for a first segment.

In still another aspect, a computer program product for dynamically setting a neuron value is disclosed. The computer program product comprises a non-transitory computer-readable medium having program code recorded thereon. The program code includes program code to receive an indication of a neuron type, to determine a set of parameter values based at least in part on the neuron type, and to generate the neural model in accordance with the parameter values.

In yet another aspect, an apparatus for generating a neuron model is disclosed. The apparatus comprises a memory and at least one processor coupled to the memory. The processor(s) is configured to receive an indication of a neuron type and determine a set of parameter values based on the neuron type. The processor(s) is further configured to generate the neural model in accordance with the parameter values.

In a further aspect, a computer program product for generating a neural model is disclosed. The computer program product comprises a non-transitory computer-readable medium having program code recorded thereon. The program code comprises program code to receive an indication of a neuron type and to determine a set of parameter values based on the neuron type. The program code further includes program code to generate the neural model in accordance with the parameter values.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 illustrates an example of an adaptable neuron data structure for defining dynamics of multiple neurons in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
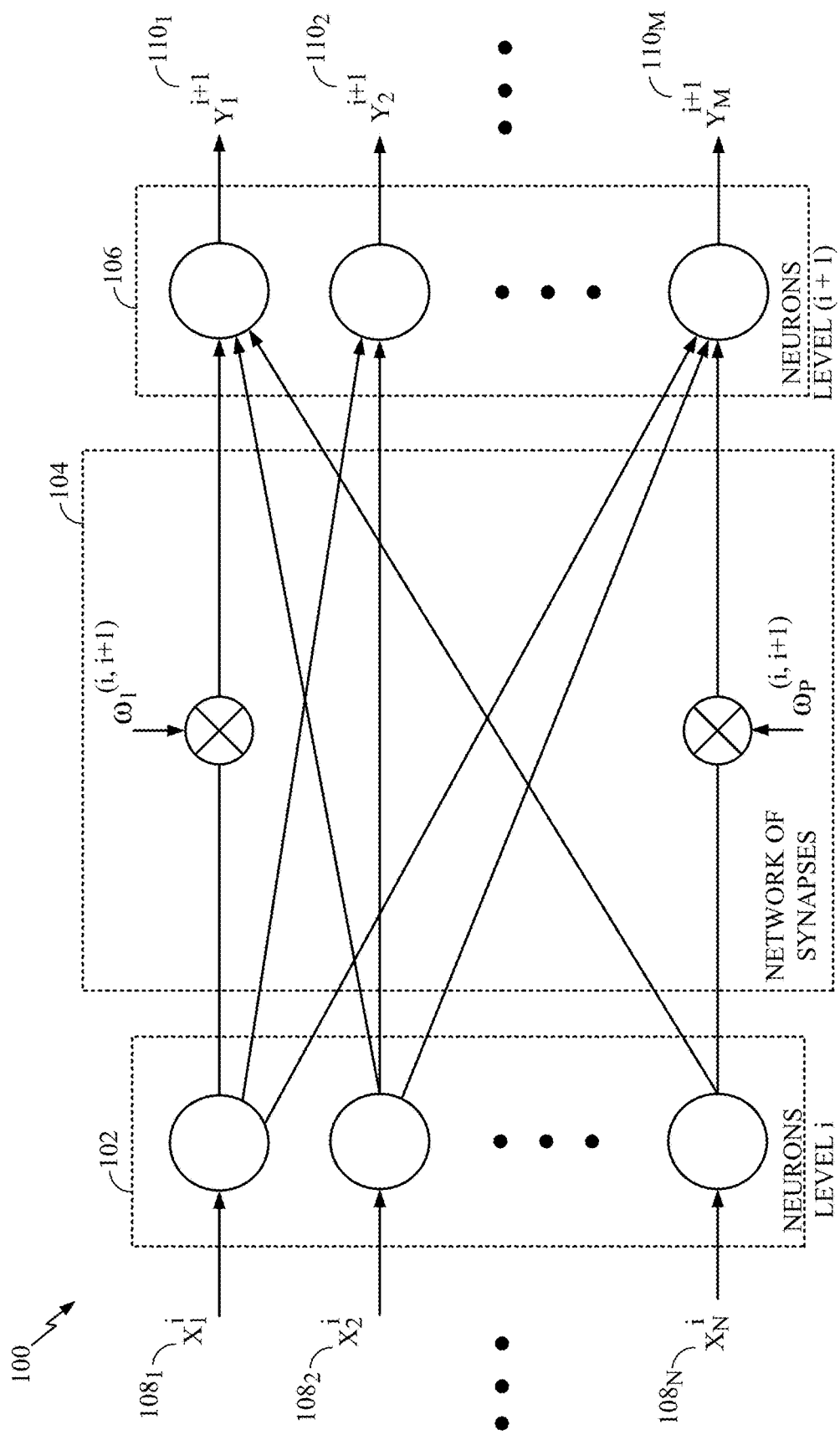
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations, such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered pre-synaptic neurons and neurons of level 106 may be considered post-synaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
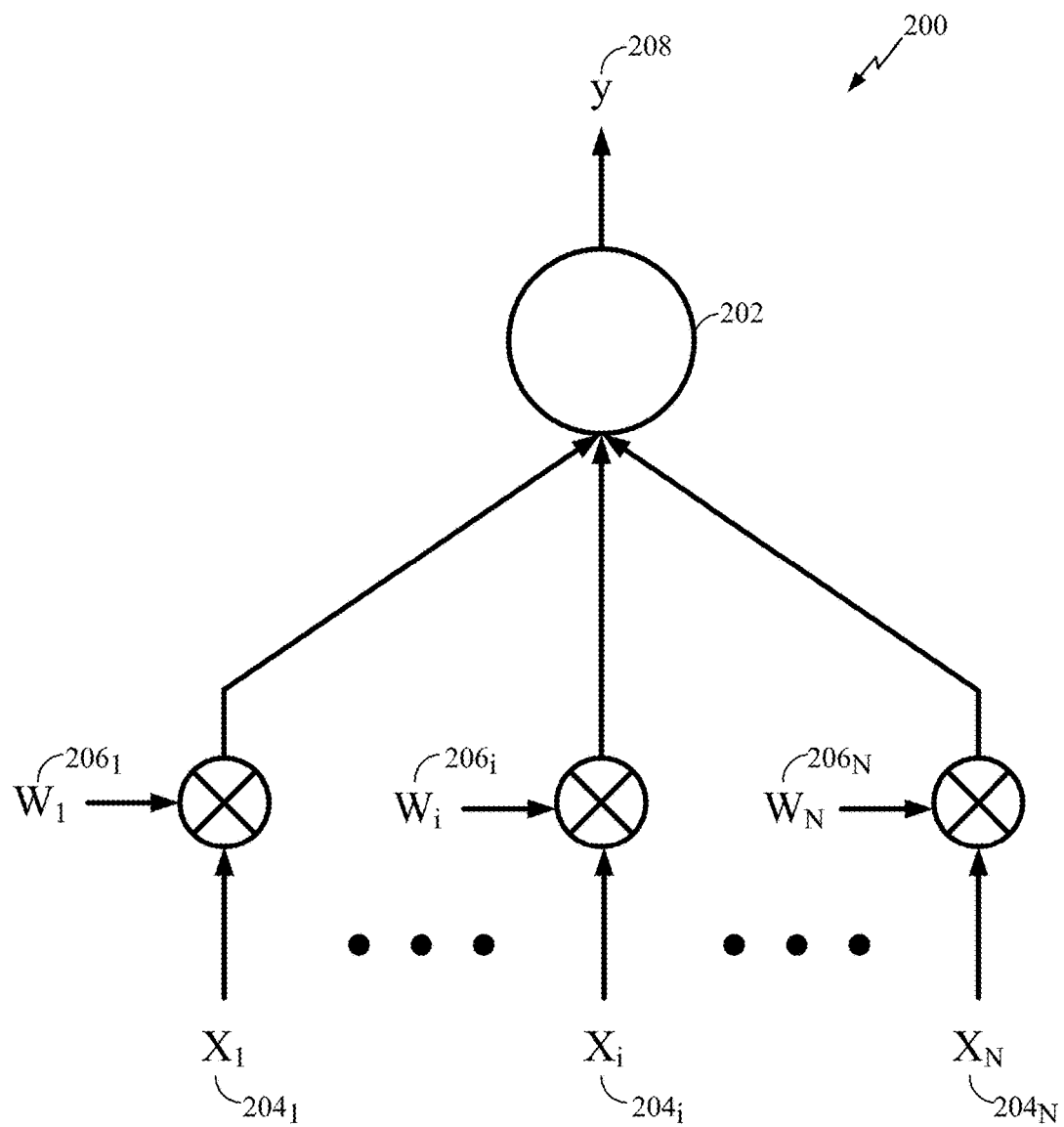
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($X_1$-$X_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, or a voltage, real-valued or complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may include non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not execute plasticity functions (or wait for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type. Use of varying synapse types may add flexibility and configurability to an artificial neural network.

There are implications of spike-timing dependent structural plasticity being executed independently of synaptic plasticity. Structural plasticity may be executed even if there is no change to weight magnitude (e.g., if the weight has reached a minimum or maximum value, or it is not changed due to some other reason) because structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to an insignificant level.

Because a neuron generally produces an output spike when many of its inputs occur within a brief period, (i.e., inputs being sufficiently cumulative to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by:

$$\Delta w(t) = \begin{cases} a_+ e^{-t/k_+} + \mu, t > 0 \\ a_- e^{t/k_-}, t < 0 \end{cases} \quad (1)$$

where $k_+$ and $k\_\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
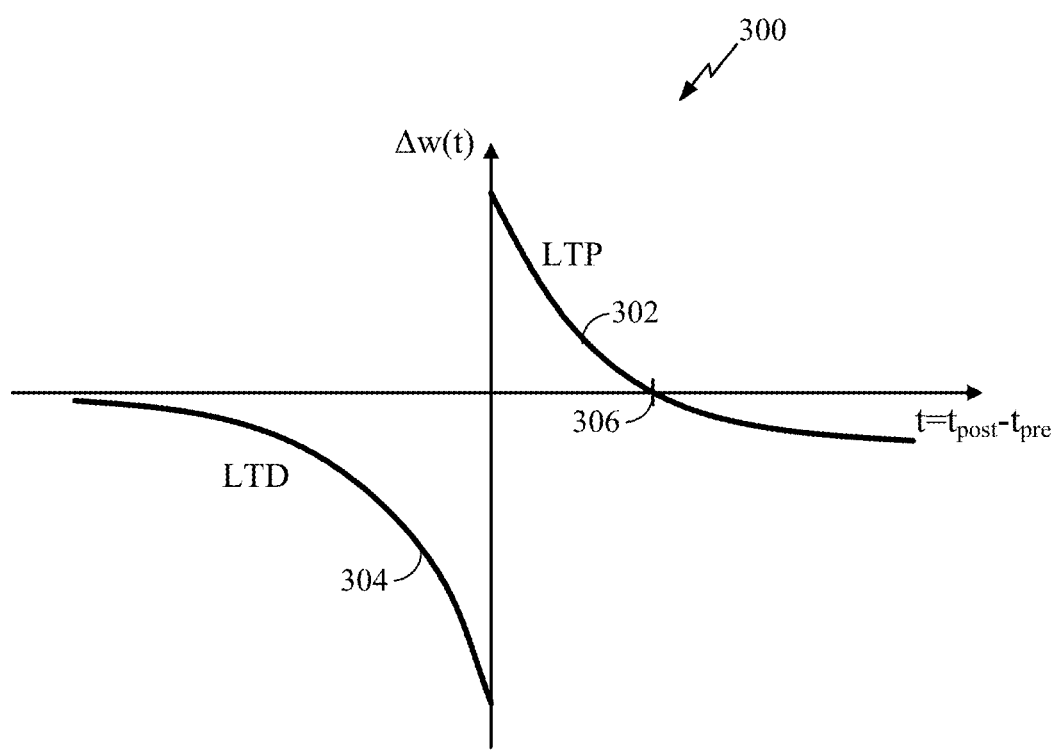
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration of spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding. For example, the arrival time of inputs affects output time and coincidence detection can have a narrow time window. Additionally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
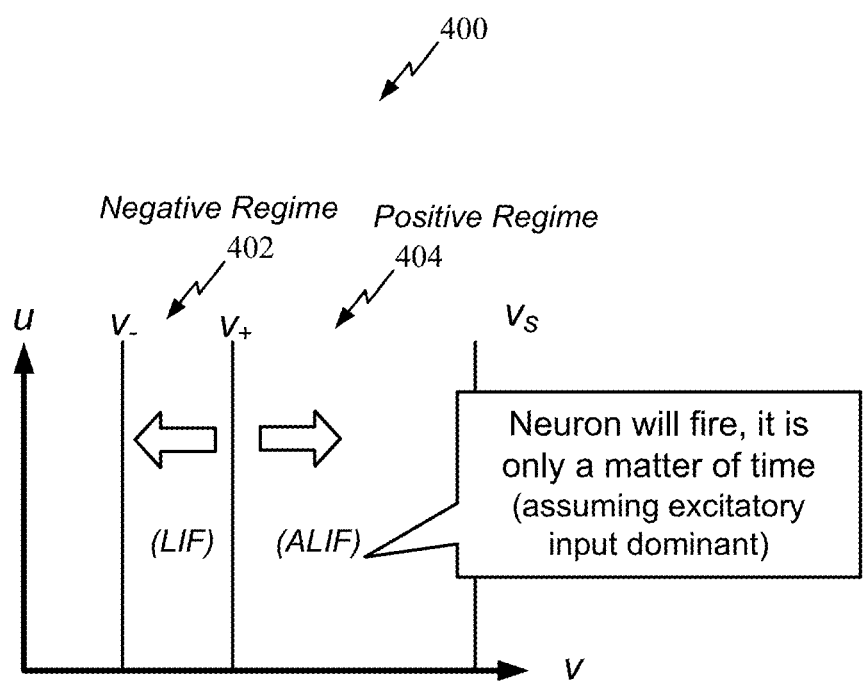
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime (which is different from the LIF neuron model)) and the positive regime 404 (also interchangeably referred to as the anti-leaky-integrate-and-fire (ALIF) regime, not to be confused with the ALIF neuron model)). In the negative regime 402, the state tends toward rest (v_) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v}_- \qquad (9)$$

$$u = u + \Delta u \qquad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \qquad (11)$$

$$u(t + \Delta t) = (u(t) + r)e^{-\frac{\Delta t}{\tau_u}} - r \qquad (12)$$

Therefore, the model state may be updated only upon events, such as an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \qquad (13)$$

If a spike is defined as occurring at the time the voltage state v reaches $v_S$, then the closed-form solution for the amount of time, or relative delay, until a spike occurs as measured from the time that the voltage is at a given state v is:

$$\Delta t_S = \begin{cases} \tau_+ \log \frac{v_S + q_+}{v + q_+} & \text{if } v > \hat{v}_+ \\ \infty & \text{otherwise} \end{cases} \qquad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods.

An event-based implementation is also possible at a limited time resolution in a step-based simulator by only updating the model if an event occurs at or between steps or by "step-event" update.

Defining Dynamics of Multiple Neurons

Neural models may be used to simulate dynamics of a neuron. Different types of dynamics may be expressed through different mathematical models that are implemented as differential equations. Researchers typically write one set of equations that govern the dynamics of some neurons and then write another set of equations that govern another set of neurons, and so on. The researchers then use these different models to create spiking neural networks to perform a certain task having specific characteristics.

Aspects of the present disclosure are directed to defining a structure that allows for simple addition, deletion, and/or replacement of neuron models and modification of neuron dynamics through specification of parameter values.

In accordance with aspects of the present disclosure, a neuron model may be expressed as:

$$v[n] = G_{11}v[n-1] + G_{12}u[n-1] + H_1 I[n-1] + v_r \qquad (15)$$

$$u[n] = G_{21}v[n-1] + G_{22}u[n-1] + H_2 I[n-1] \qquad (16)$$

where v is the membrane voltage and u is the recovery variable and the specific values of the neuron parameters $G_{ij}$ and $H_k$ define the neuron model dynamics.

By determining the values for the neuron parameters $G_{ij}$ and $H_k$, the form of the neuron model equations may be preserved such that the addition of a new neuron model only causes the specification of new neuron parameter values for $G_{ij}$ and $H_k$, for example.

FIG. 5 illustrates an exemplary data structure for use in determining a neural value for defining dynamics of multiple neurons. An adaptable data structure for neuron parameter values $G_{11}$ (505), $G_{12}$ (510), $G_{21}$ (515), $G_{22}$ (520), $H_1$ (525) and $H_2$ (530) is shown. The adaptable data structure for each neuron parameter value may be organized according to a neuron type and a bin or segment. The neuron type may indicate the type of neuron (e.g., motor, sensory, etc.) to be modeled and may specify a set of dynamics for a neuron. Each row of the data structure (labeled a, b, or c for ease of explanation) for a neuron parameter may correspond to a neuron type.

The bin count defines a number of bins or segments used when discretizing the membrane voltage v and may correspond to a column of the data structure (labeled 1-8 for ease of explanation) for a neuron parameter. That is, the membrane voltage may be distributed over a predetermined number of segments. For example, in the Cold model described above, two segments are used. A non-linear function can be used when switching from bin to bin.

FIG. 5 presents another example, as the membrane voltage is distributed over eight segments. Of course, the illustrated number of bins or segments is exemplary only and not limiting.

Each segment may correspond to a state of a neuron. In some aspects, the neuron may exhibit different dynamics according to the segment. However, this may not be the case, and for some neurons, the dynamics may be the same for multiple segments.

In some configurations, the bin count (i.e., the number of segments) may be a fixed value for all neuron types. This may be beneficial, for example, when the memory is limited, as the number of segments may be small. Of course, this is merely exemplary, and, in some configurations, the number of segments may be variable. That is, each neuron type may have its own number of segments or bins. Further, the number of segments may also vary according to the membrane voltage v, recovery variable u, other state or system variables, or a combination thereof When retrieving the parameter values for a particular neuron type, the index of the appropriate segments may be determined using the previous value of the membrane voltage v[n−1]. For example, referring to FIG. 5, when the neuron type is a and the segment is 5, the parameter value G11 may be set to −0.588, G12 may be set to 1.191, G21 may be set to 0.000, G22 may be set to 0.212, H1 may be set to −0.947, and H2 may be set to −0.990. Accordingly, values (e.g., membrane voltage v) for a neuron model may quickly be specified.

In some configurations, the segment index value may depend on other state variables of the neuron such as, the recovery value u, a combination of recovery value u and the membrane voltage, or may be given by an arbitrary function (linear or non-linear) of any state and/or neural network variables.

In some configurations, the parameters (e.g., $G_{ij}$ and $H_k$) may be used to define a specific neuron type or singleton neuron. That is, a neuron type may be created for which only a single neuron instance exists. In effect, the dynamics of a single neuron in the network are created. As such, any desired number of singleton neurons may be generated.

Further, in some configurations, a single neuron type may be perturbed to diversify neurons within a network. For example, the parameters (e.g., $G_{ij}$ and $H_k$) may be perturbed by applying small additive, random values from a given distribution, or using random values seeded by unique values of the neuron. In some aspects, perturbation bounds may also be specified to prevent problems with neuron dynamics.

In some configurations, the parameter values may also be compressed. Although the parameter values are defined for a certain number of segments, it may not always be possible to instantiate all of the specified parameter values. For example, if a neuron type is defined with a very large number of segments, there may be insufficient memory available on a target platform for storing all of the parameter values. As such, the number of parameter values may be decreased using a different segment-indexing function, for example, as described above. In some aspects, the segment-indexing function that decreases or compresses the number of segments may be available either in the compiler or on the target platform. In this way, the parameter compression may be automated, thus relieving the user of having to decrease the number of parameter values manually.

In addition to perturbing the parameter values for neuron types, in some aspects, the parameters for individual instances of neurons in the network may also be perturbed. By perturbing either the parameter values of a neuron type or the parameter values of all instances, a set of neurons can be generated such that each may have slightly different dynamics. The perturbed parameter values may be then stored along with the unperturbed parameters. Again, perturbation bounds may be specified to prevent problems with neuron dynamics. The perturbation can be based on extra bits stored for each instance.

Figure 6:
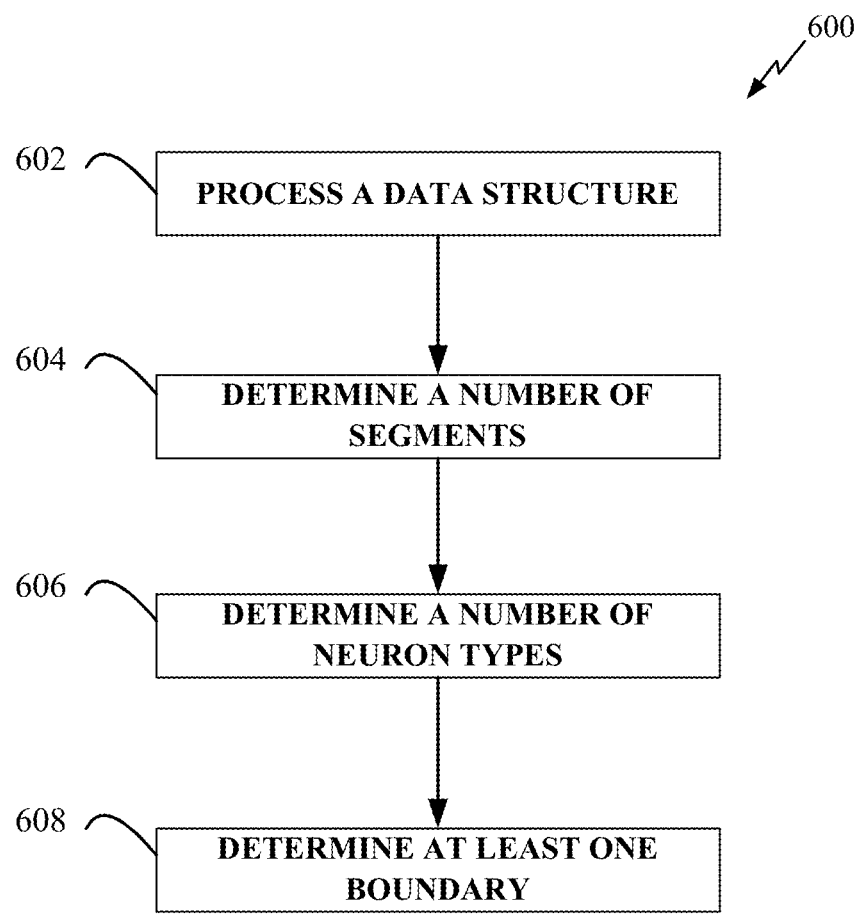
FIG. 6 is a flow diagram illustrating a method for dynamically setting a neuron value in accordance with an aspect of the present disclosure.

In some configurations, the dynamics of a neuron type may be adapted over time. That is, although the parameters may be defined by a researcher, the parameters may not remain static. Instead, the parameter values determined may define initial neuron dynamics that are dynamically modified during simulation of a neural network. For example, the modification may be a function of any number of factors, such as firing rate, number of incoming synapses, synaptic weight changes, spike-time distributions, statistics, network properties or a combination thereof FIG. 6 is a flow diagram illustrating a process 600 for defining dynamics of multiple neurons in accordance with aspects of the present disclosure. At block 602, the method processes a data structure comprising a set of parameters for a neuron model. The parameters may be neuron parameters $G_{ij}$ and $H_k$ that define neuron model dynamics.

At block 604, the process determines a number of segments defined in the set of parameters. The number of segments or bins may be a fixed value or may be dynamically set according to neuron type or as a function of state variables of the neuron such as, the recovery value u, a combination of recovery value u and the membrane voltage v, or may be given by an arbitrary function of any state and/or neural network variables.

Further, the number of segments may also vary for the neuron types. That is, the neuron types may not have the same number of segments. Rather, in accordance with aspects of the present disclosure, a different number of segments may be defined for each of the neuron types. In some configurations, the number of segments may be modified based on system factors such as memory availability.

At block 606, the process determines a number of neuron types defined in the set of parameters. For example, as shown in FIG. 5, each of the parameters includes three rows corresponding to three neuron types.

At block 608, the process determines at least one boundary for a segment within the set of parameters. In some aspects, multiple boundaries may be included to further segment the dynamic range for the neurons.

The location of the boundaries may be determined according to design preference within the dynamic range. For example, as shown in FIG. 5, seven boundaries are provided to divide the dynamic range for the respective neuron types (i.e., a, b, and c) into eight segments. In some aspects, the boundaries may also be evenly distributed over the dynamic range.

Figure 7:
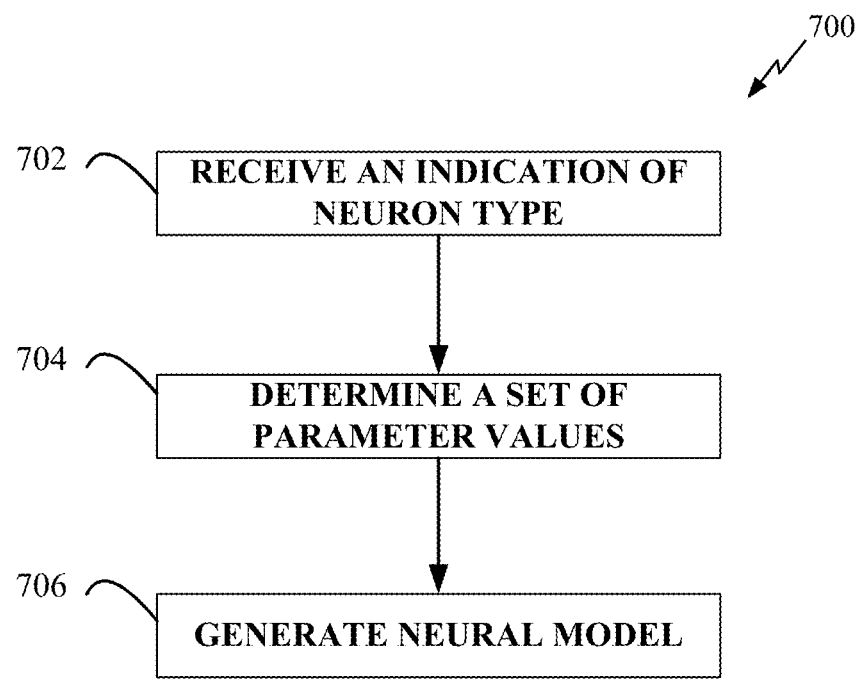
FIG. 7 is a flow diagram illustrating a method for dynamically setting a neuron value in accordance with an aspect of the present disclosure.

FIG. 7 is a block diagram illustrating a method 700 for dynamically setting a neuron value in accordance with an aspect of the present disclosure. At block 702, an indication of neuron type is received. At block 704, a set of parameters is determined. At block 706, a neural model is generated.

Figure 8:
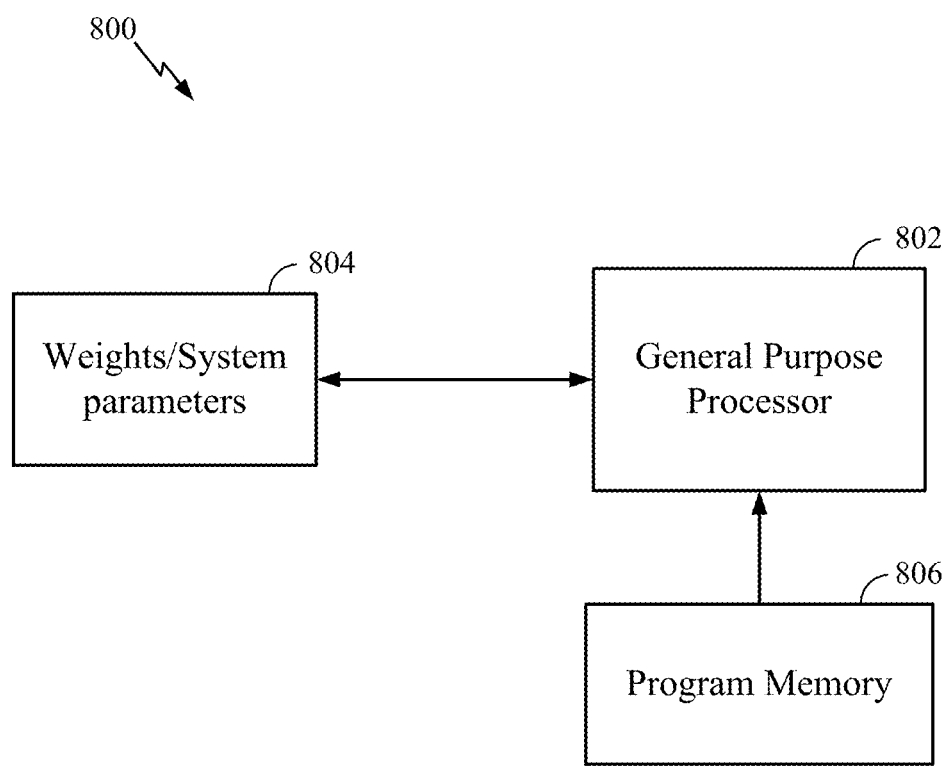
FIG. 8 illustrates an example implementation of designing a neural network using a general-purpose processor in accordance with certain aspects of the present disclosure.

FIG. 8 illustrates an example implementation 800 of the aforementioned dynamically setting a neuron value using a general-purpose processor 802 in accordance with certain aspects of the present disclosure. Variables (neural signals), synaptic weights, system parameters associated with a computational network (neural network), delays, frequency bin information, neuron type information, and state variables may be stored in a memory block 804, while instructions executed at the general-purpose processor 802 may be loaded from a program memory 806. In an aspect of the present disclosure, the instructions loaded into the general-purpose processor 802 may comprise code for processing a data structure comprising a set of parameters for a neuron model, determine a number of segments defined in the set of parameters, determine a number of neuron types defined in the set of parameters and determine at least one boundary for a first segment.

Figure 9:
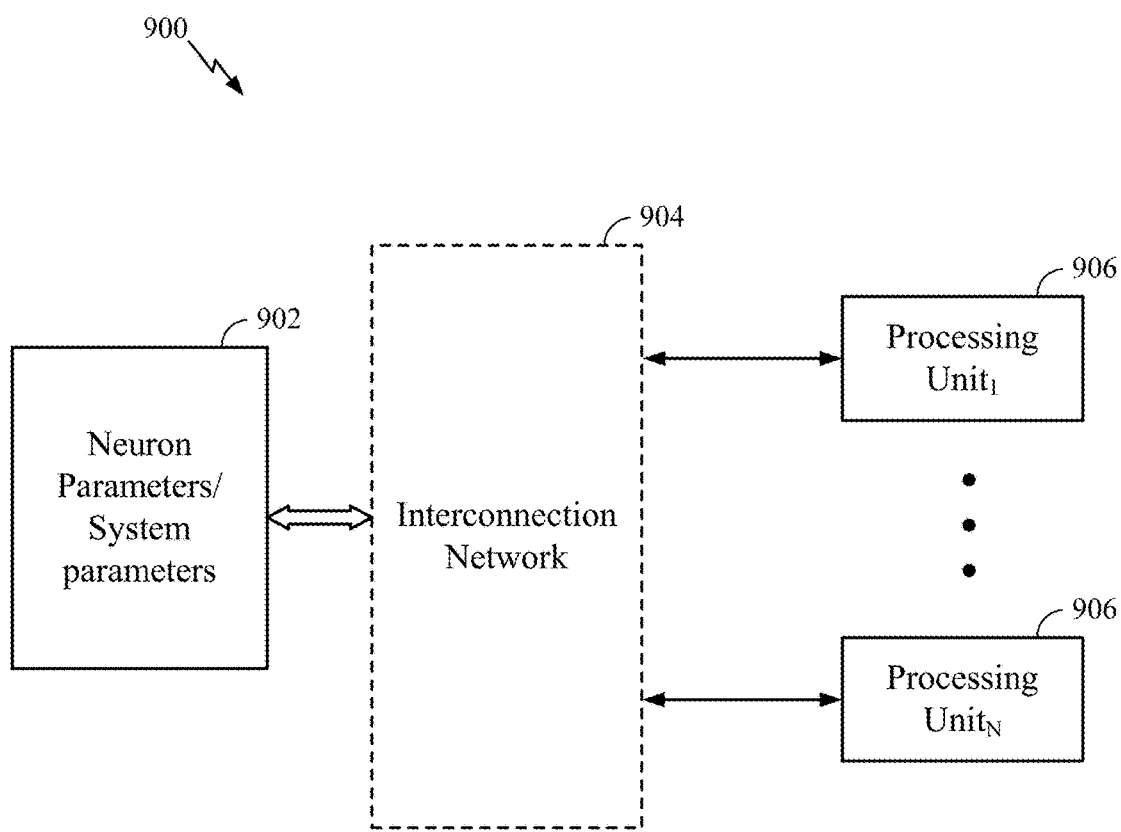
FIG. 9 illustrates an example implementation of designing a neural network where a memory may be interfaced with individual distributed processing units in accordance with certain aspects of the present disclosure.

FIG. 9 illustrates an example implementation 900 of the aforementioned dynamically setting a neuron value where a memory 902 can be interfaced via an interconnection network 904 with individual (distributed) processing units (neural processors) 906 of a computational network (neural network) in accordance with certain aspects of the present disclosure. Variables (neural signals), synaptic weights, system parameters associated with the computational network (neural network) delays, frequency bin information, neuron type information, and/or state variables may be stored in the memory 902, and may be loaded from the memory 902 via connection(s) of the interconnection network 904 into each processing unit (neural processor) 906. In an aspect of the present disclosure, the processing unit 906 may be configured dynamically set a neuron value.

Figure 10:
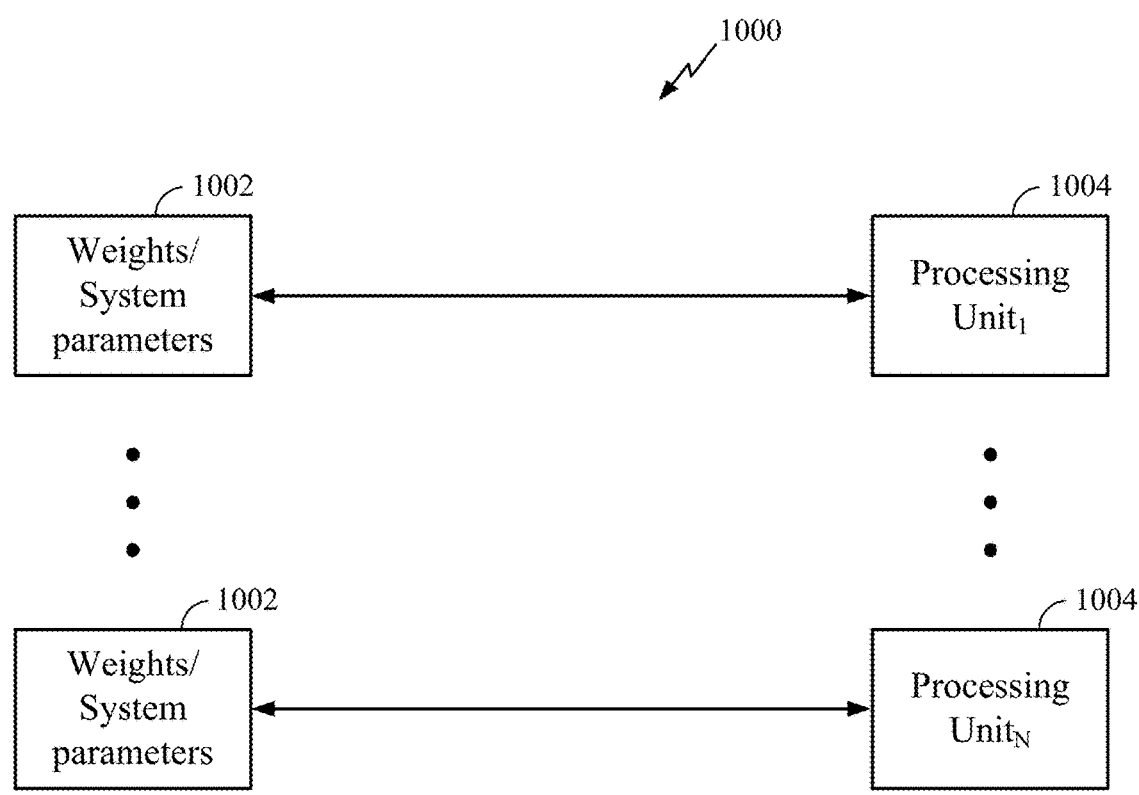
FIG. 10 illustrates an example implementation of designing a neural network based on distributed memories and distributed processing units in accordance with certain aspects of the present disclosure.

FIG. 10 illustrates an example implementation 1000 of the aforementioned dynamically setting a neuron value. As illustrated in FIG. 10, one memory bank 1002 may be directly interfaced with one processing unit 1004 of a computational network (neural network). Each memory bank 1002 may store variables (neural signals), synaptic weights, and/or system parameters associated with a corresponding processing unit (neural processor) 1004 delays, frequency bin information neuron type information, and state variables. In an aspect of the present disclosure, the processing unit 1004 may be configured to dynamically set a neuron value.

Figure 11:
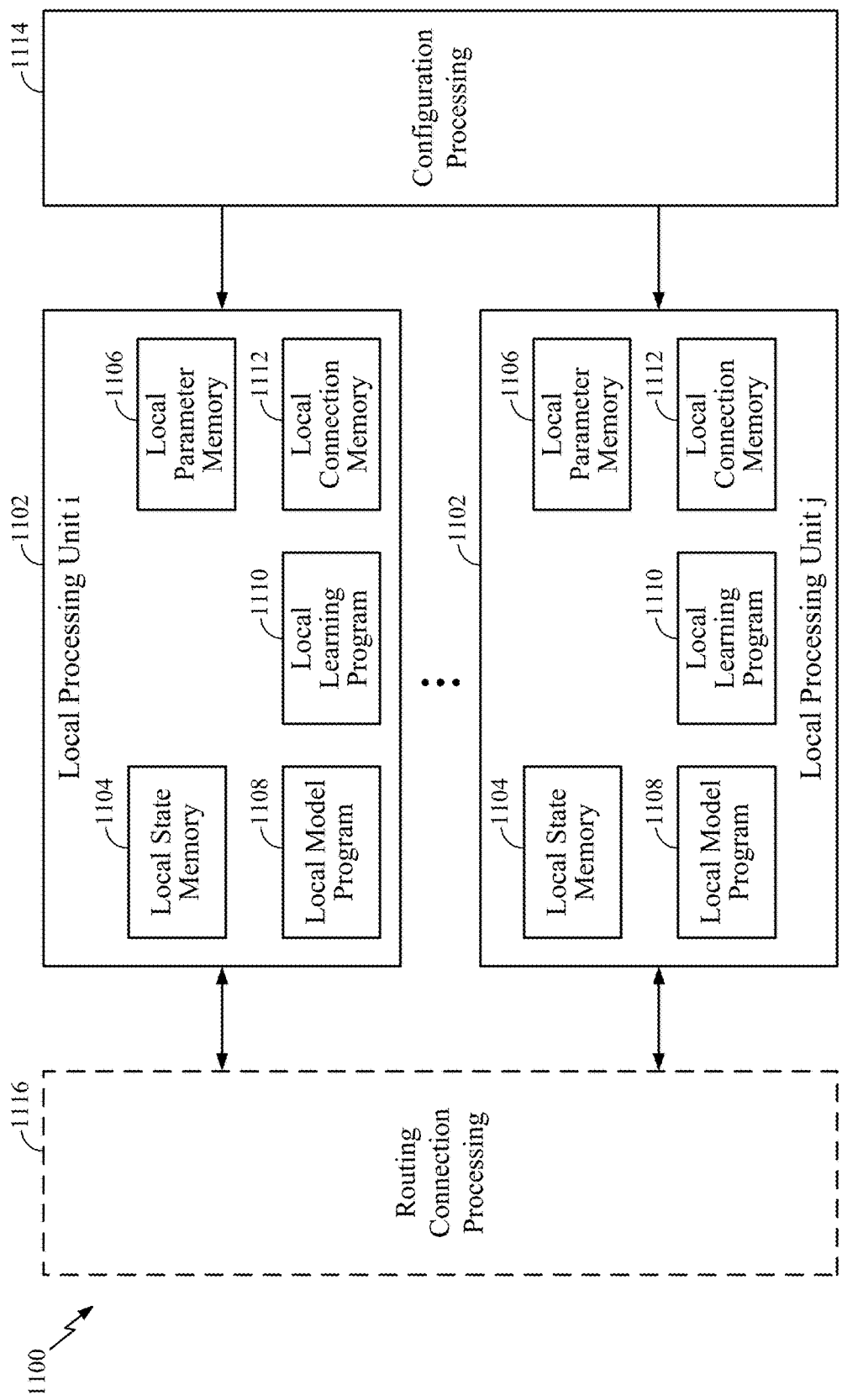
FIG. 11 illustrates an example implementation of a neural network in accordance with certain aspects of the present disclosure.

FIG. 11 illustrates an example implementation of a neural network 1100 in accordance with certain aspects of the present disclosure. As illustrated in FIG. 11, the neural network 1100 may have multiple local processing units 1102 that may perform various operations of methods described above. Each local processing unit 1102 may comprise a local state memory 1104 and a local parameter memory 1106 that store parameters of the neural network. In addition, the local processing unit 1102 may have a memory 1108 with local (neuron) model program, a memory 1110 with local learning program, and a local connection memory 1112. Furthermore, as illustrated in FIG. 11, each local processing unit 1102 may be interfaced with a unit 1114 for configuration processing that may provide configuration for local memories of the local processing unit, and with routing connection processing elements 1116 that provide routing between the local processing units 1102.

In one configuration, a neuron model is configured for dynamically setting a neuron value. In one aspect, the neuron model has processing means, means for determining a number segments, means for determining a number of neuron types, and/or means for determining at least one boundary. The means may be the general-purpose processor 802, program memory 806, memory block 804, memory 902, interconnection network 904, processing units 906, processing unit 1004, local processing units 1102, and or the routing connection processing elements 1116 configured to perform the functions recited. In another configuration, the aforementioned means may be any module or any apparatus configured to perform the functions recited by the aforementioned means.

According to certain aspects of the present disclosure, each local processing unit 1102 may be configured to determine parameters of the neural network based upon desired one or more functional features of the neural network, and develop the one or more functional features towards the desired functional features as the determined parameters are further adapted, tuned and updated.

In another configuration, the aforementioned means may be any module or any apparatus configured to perform the functions recited by the aforementioned means. That is, the various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the FIG. 10, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Further, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method for configuring data in a data structure for dynamically setting a neuron value for a neuron in an artificial neural network, the method comprising:
   determining a number of segments to be represented in the data of the data structure comprising a set of parameters for a neuron model;
   determining a number of neuron types to be represented in the set of parameters; and
   determining at least one boundary in the data of the data structure to define at least one data segment in the data, the data in each segment being configured for dynamically setting the neuron value for the neuron in the artificial neural network, wherein the set of parameters are indexed according to a neuron type.

2. The method of claim 1, further comprising determining at least one of a first state variable or a second state variable for the neuron based at least in part on the set of parameters configured in the at least one data segment, one or more of the first state variable and the second state variable being used to determine a spiking threshold for a specific neuron.

3. The method of claim 2, in which the parameters for one or more of a membrane voltage and a recovery variable are selected based at least in part on the neuron type.

4. The method of claim 2, in which the first state variable comprises a membrane voltage, and the second state variable comprises a recovery variable.

5. The method of claim 1, in which the determined number of segments is variable for each neuron type.

6. The method of claim 1, in which the at least one boundary is determined based on a function of one state variable.

7. The method of claim 1, in which the at least one boundary is determined based on a function of at least two state variables.

8. The method of claim 1, in which the parameters define initial neuron dynamics.

9. The method of claim 1, in which the parameters are dynamically updated based at least in part on a firing rate, incoming synapses, synaptic weight, or a combination thereof.

10. A method for generating a neural model for an artificial neural network, the method comprising:
   receiving information specifying a neuron type;
   determining a set of parameter values using data of a data structure based at least in part on the neuron type, the parameter values being indexed according to the neuron type;
   generating the neural model in the artificial neural network in accordance with the parameter values corresponding to the specified neuron type; and
   operating the artificial neural network with the neural model.

11. An apparatus for dynamically setting a neuron value for a neuron in an artificial neural network comprising:
   a memory; and
   at least one processor coupled to the memory, the at least one processor being configured:
     to determine a number of segments to be represented in data of a data structure comprising a set of parameters for a neuron model;
     to determine a number of neuron types to be represented in the set of parameters; and
     to determine at least one boundary in the data of the data structure to define at least one data segment in the data, the data in each segment being configured for dynamically setting the neuron value for the neuron in the artificial neural network, wherein the set of parameters are indexed according to a neuron type.

12. The apparatus of claim 11, in which the at least one processor is further configured to determine at least one of a first state variable or a second state variable for the neuron based at least in part on the set of parameters configured in the at least one data segment, one or more of the first state variable and the second state variable being used to determine a spiking threshold for a specific neuron.

13. The apparatus of claim 12, in which the parameters for one or more of a membrane voltage and a recovery variable are selected based at least in part on the neuron type.

14. The apparatus of claim 12, in which the first state variable comprises a membrane voltage, and the second state variable comprises a recovery variable.

15. The apparatus of claim 11, in which the determined number of segments is variable for each neuron type.

16. An apparatus for dynamically setting a neuron value for a neuron in an artificial neural network comprising:
   means for determining a number of segments defined in data of a data structure comprising a set of parameters for a neuron model;
   means for determining a number of neuron types defined in the set of parameters; and
   means for determining at least one boundary in the data of the data structure to define at least one data segment in the data, the data in each segment being configured for dynamically setting the neuron value for the neuron in the artificial neural network, wherein the set of parameters are indexed according to a neuron type.

17. A non-transitory computer-readable medium having program code recorded thereon for dynamically setting a neuron value for a neuron in an artificial neural network, the program code being executed by a processor and comprising:
   program code to determine a number of segments to be represented in data of a data structure comprising a set of parameters for a neuron model in the set of parameters;
   program code to determine a number of neuron types to be represented in the set of parameters; and
   program code to determine at least one boundary in the data of the data structure to define at least one data segment in the data, the data in each segment being configured for dynamically setting the neuron value for the neuron in the artificial neural network, wherein the set of parameters are indexed according to a neuron type.

18. An apparatus for generating a neural model for an artificial neural network comprising:
   a memory; and
   at least one processor coupled to the memory, the at least one processor being configured:
      to receive information specifying a neuron type;
      to determine a set of parameter values using data of a data structure based at least in part on the neuron type, the parameter values being indexed according to the neuron type;
      to generate the neural model in the artificial neural network in accordance with the parameter values corresponding to the specified neuron type; and
      operating the artificial neural network with the neural model.

19. An apparatus for generating a neural model for an artificial neural network comprising:
   means for receiving information specifying a neuron type;
   means for determining a set of parameter values using data of a data structure based at least in part on the neuron type, the parameter values being indexed according to the neuron type;
   means for generating the neural model in the artificial neural network in accordance with the parameter values corresponding to the specified neuron type; and
   means for operating the artificial neural network with the neural model.

20. A non-transitory computer-readable medium having program code recorded thereon for generating a neural model for an artificial neural network, the program code being executed by a processor and comprising:
   program code to receive information specifying a neuron type;
   program code to determine a set of parameter values using data of a data structure based at least in part on the neuron type, the parameter values being indexed according to the neuron type;
   program code to generate the neural model in the artificial neural network in accordance with the parameter values corresponding to the specified neuron type; and
   operating the artificial neural network with the neural model.

* * * * *